United States Patent [19]

Kaneko et al.

[11] Patent Number: 5,006,276
[45] Date of Patent: Apr. 9, 1991

[54] LIQUID CRYSTAL COMPOSITION AND DISPLAY ELEMENT USING THE SAME

[75] Inventors: Masaharu Kaneko, Kanagawa; Takanori Nakajima, Tokyo, both of Japan

[73] Assignee: Mitsubishi Kasei Corporation, Japan

[21] Appl. No.: 397,445

[22] PCT Filed: Dec. 7, 1988

[86] PCT No.: PCT/JP88/01230
§ 371 Date: Aug. 3, 1989
§ 102(e) Date: Aug. 3, 1989

[87] PCT Pub. No.: WO89/05338
PCT Pub. Date: Jun. 15, 1989

[30] Foreign Application Priority Data

Dec. 8, 1987 [JP] Japan .................. 62-310625

[51] Int. Cl.$^5$ .................. C09K 19/32; C09K 19/16; C09K 19/11
[52] U.S. Cl. .................. 252/299.1; 252/299.01; 252/299.61; 252/299.63
[58] Field of Search ........... 252/299.01, 299.1, 299.61, 252/299.62, 299.63, 299.66, 299.67; 350/349

[56] References Cited

U.S. PATENT DOCUMENTS

| 4,495,083 | 1/1985 | Imazeki et al. | 252/299.1 |
| 4,507,221 | 3/1985 | Imazeki et al. | 252/299.1 |
| 4,863,634 | 9/1989 | Clausen et al. | 252/299.1 |

OTHER PUBLICATIONS

Japanese Abstract, 87-120106/17, 87-120104/17.

Primary Examiner—Robert L. Stoll
Assistant Examiner—Greg M. Sweet
Attorney, Agent, or Firm—Jordan B. Bierman

[57] ABSTRACT

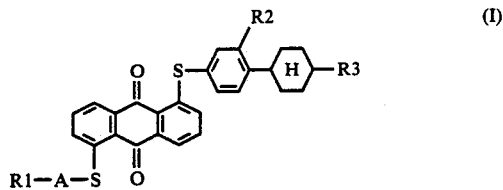
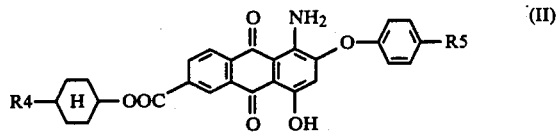
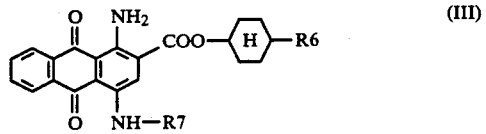
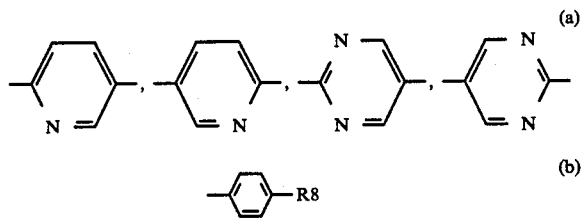

A liquid crystal composition and a display element using the same are disclosed. The composition contains at least one dichroic dye represented by general formula (I), at least one dichroic dye represented by general formula (II), and at least one dichroic dye represented by general formula (III). In formula (I), R1 to R3 each represent a hydrogen atom, an alkyl group, an optionally substituted cycloalkyl group, an alkoxyalkyl group, an alkoxy group or a halogen atom; and A represents (a); in formula (II), R4 and R5 each represents a hydrogen atom, an alkyl group, an optionally substituted cycloalkyl group, an alkoxyalkyl group, an alkoxy group or a halogen atom; in formula (III), R6 represents a hydrogen atom, an alkyl group, an optionally substituted cycloalkyl group, an alkoxyalkyl group, an alkoxy group or a halogen atom. R7 represents a hydrogen atom or (b), and R8 represents a hydrogen atom, an alkyl group, an optionally substituted cycloalkyl group, an alkoxyalkyl, an alkoxy group or a halogen atom.

19 Claims, No Drawings

LIQUID CRYSTAL COMPOSITION AND DISPLAY ELEMENT USING THE SAME

FIELD OF THE INVENTION

This invention relates to a liquid crystal composition, which is excellent in stability at a low temperature, contrast and light-resistance and a display element using the same.

BACKGROUND OF THE INVENTION

A display element taking advantage of a guest/host effect achieved by adding a dichroic dye to liquid crystals has attracted public attention as a display element suitable for a medium to large-scale display, since it has the following advantages:

(1) Having a wide angle of view;
(2) Capable of readily realizing a colorful display by selecting dyes; and
(3) Not always requiring a polarizing plate and thus capable of giving a clear display.

Conventional display elements taking advantage of a guest/host effect achieved by adding a dichroic dye to liquid crystals can hardly satisfy a high stability at a low temperature, a high contrast, high lightshielding properties, a long lifetime and various hues at the same time. A contrast ratio is expressed in the ratio of the volume of light at the transmission to that at the shade. In order to achieve a high contrast ratio, therefore, it is required not only to give a high dichroic ratio of the dye but also to lower the volume of transmitted light corresponding to the denominator, namely, elevating the solubility of the dichroic dye. When different types of dyes are blended together, however, an irregularity is sometimes observed in the solubility of each dye component in the blending system and that observed when each dye is used alone. That is to say, the solubilities in the blending system frequently fail to achieve an additive property. When different types of dyes are blended together, furthermore, the photo-deterioration of some of these dyes is frequently accelerated. As a result, it becomes difficult to simultaneoulsy satisfy a high stability at a low temperature, a high contrast, high light insulating properties and a long lifetime in the cases of, in particular, practically valuable colors such as black or dark blue.

In order to overcome these problems, JP-A-62-064887 has disclosed a liquid crystal composition comprising specific dichroic dyes of three types and a display element using the same.

It is an object of the present invention to provide a color liquid crystal composition which is excellent in stability at a low temperature, contrast and light-resistance and superior, in particular, in contrast and light-shieding properties to the one disclosed in JP-A-62-064887 as well as a display element to thereby solve the abovementioned problems such as the irregularity in solubilities and photodeterioration.

DESCRIPTION OF THE INVENTION

The gist of the present invention resides in a liquid crystal composition comprising at least one dichroic dye represented by each of the following general formulae I to III and in a display element using said composition.

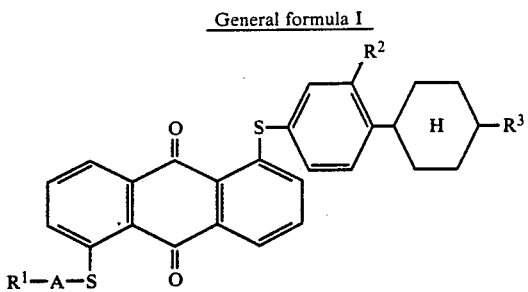

General formula I wherein $R^1$ to $R^3$ represent each a hydrogen atom, an alkyl, an optionally substituted cycloalkyl, an alkoxyalkyl or an alkoxy group or a halogen atom; and A represents a

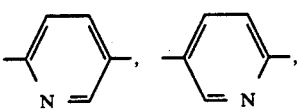

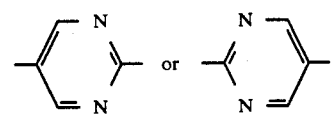

group.

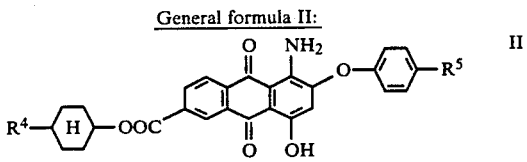

General formula II:

wherein $R^4$ and $R^5$ represent each a hydrogen atom, an alkyl, an optionally substituted cycloalkyl, an alkoxyalkyl or an alkoxy group or a halogen atom.

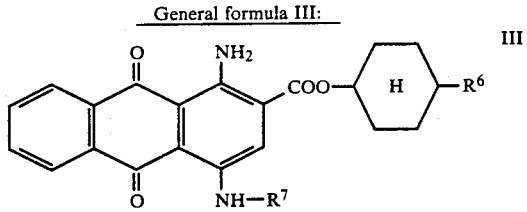

General formula III:

wherein $R^6$ represents a hydrogen atom, an alkyl, an optionally substituted cycloalkyl, an alkoxyalkyl or an alkoxy group or a halogen atom; and $R^7$ represents a hydrogen atom or a

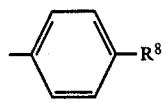

group; wherein $R^8$ represents a hydrogen atom, an alkyl, an optionally substituted cycloalkyl, an alkoxyalkyl or an alkoxy group or a halogen atom.

Now the present invention will be described in detail. Examples of the groups $R^1$ to $R^6$ and $R^8$ include a hydrogen atom; straight-chain or branched alkyl groups such as methyl, ethyl, propyl, butyl, pentyl, hexyl, octyl, nonyl and dodecyl groups; cycloalkyl groups optionally substituted with, for example, straight-chain or branched alkyl group(s) such as propylcyclohexyl, butylcyclohexyl, pentylcyclohexyl, hexylcyclohexyl and octylcyclohexyl groups; straight-chain or branched alkoxyalkyl groups such as methoxymethyl, butoxymethyl, ethoxyethyl and butoxyethyl groups; straight-chain or branched alkoxy groups such as methoxy, ethoxy, propoxy, butoxy, pentoxy and octoxy groups; and halogen atoms such as fluorine, chlorine and bromine atoms.

In the dye represented by the general formula I, it is preferable that $R^1$ and $R^3$ represent each a hydrogen atom or an alkyl group; $R^2$ represents a hydrogen atom; and A represents a

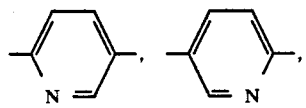 , 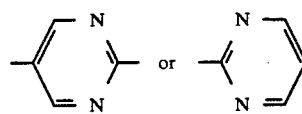

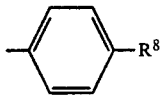 or 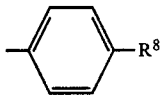

group.

It is further preferable that $R^1$ represents a hydrogen atom or an alkyl group having 1 to 8 carbon atoms and $R^3$ represents an alkyl group having 1 to 8 carbon atoms. It is the most preferable that $R^1$ and $R^2$ represent each a hydrogen atom; $R^3$ represents an alkyl group having 1 to 8 carbon atoms; and A represents a

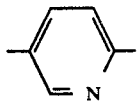

group.

In the dye represented by the general formula II, it is preferable that $R^4$ and $R^5$ represent each a hydrogen atom or an alkyl group.

It is further preferable that $R^4$ and $R^5$ represent each an alkyl group having 2 to 8 carbon atoms.

In the dye represented by the general formula III, it is preferable that $R^6$ represents a hydrogen atom or an alkyl group; $R^7$ represents a hydrogen atom or a

[benzene ring with $R^8$]

group; and $R^8$ represents a hydrogen atom or an alkyl group.

It is further preferable that $R^6$ represents an alkyl group having 2 to 10 carbon atoms; $R^7$ represents a hydrogen atom or a

[benzene ring with $R^8$]

group; and $R^8$ represents an alkyl group having 2 to 8 carbon atoms.

Examples of dyes available in the present invention are summarized in the following Table 1. However it is needless to say that the present invention is not restricted thereby.

TABLE 1

| General formula | | Dye | $R^1$ | $R^2$ | $R^3$ | A |
|---|---|---|---|---|---|---|
| I | [anthraquinone structure with $R^1$—A—S and S-phenyl-cyclohexyl-$R^3$, $R^2$] | I-1 | H | H | $C_4H_9(N)$ | [pyridyl] |
| | | I-2 | $CH_3$ | H | $C_2H_5$ | [pyridyl] |
| | | I-3 | $C_4H_9(t)$ | H | $C_4H_9(n)$ | [pyridyl] |
| | | I-4 | $C_4H_9(t)$ | H | $C_6H_{13}(n)$ | [pyridyl] |

TABLE 1-continued
| General formula | | No. | R¹ | R² | R³ | |
|---|---|---|---|---|---|---|
| I | 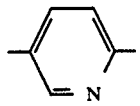 | I-5 | C₄H₉(n) | H | C₄H₉(n) | 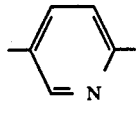 |
| | | I-6 | C₆H₁₃(t) | H | C₆H₁₃(n) | 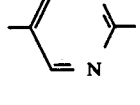 |
| | | I-7 | C₄H₉(n) | H | C₄H₉(n) | 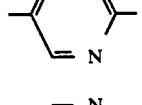 |
| | | I-8 | C₄H₉(n) | H | C₆H₁₃(n) | 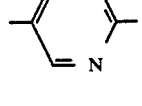 |
| | | I-9 | C₆H₁₃(n) | H | C₄H₉(t) | 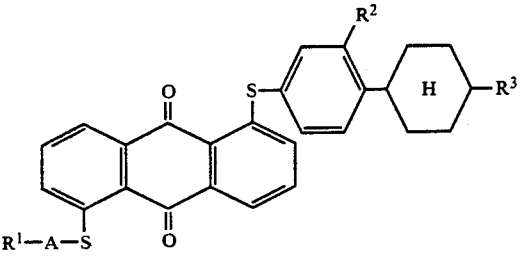 |
| | | I-10 | C₂H₅ | H | C₆H₁₃(n) | 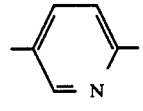 |
| | | I-11 | C₃H₇(n) | H | C₅H₁₁(n) | 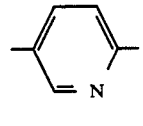 |
| | | I-12 | H | H | C₄H₉(n) | 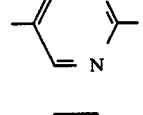 |
| | | I-13 | H | H | CH₃ | 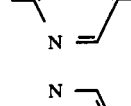 |
| | | I-14 | H | H | C₃H₇(n) | 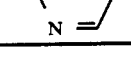 |
| General formula | | Dye | R⁴ | R⁵ |
|---|---|---|---|---|
| II | 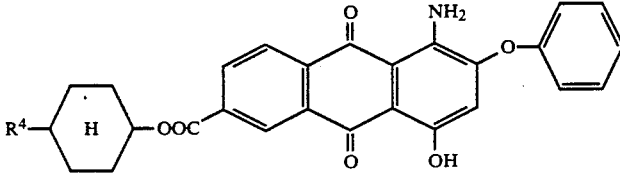 | II-1 | C₄H₉(n) | C₄H₉(n) |
| | | II-2 | C₄H₉(n) | C₇H₁₅(n) |
| | | II-3 | H | H |

TABLE 1-continued

| General formula | | Dye R⁶ | R⁷ |
|---|---|---|---|
| III | ![structure] | | |
| | III-1 | C₄H₉(n) | H |
| | III-2 | C₈H₁₇(n) | H |
| | III-3 | C₆H₁₃(n) | H |
| | III-4 | C₄H₉(n) | —⟨C₆H₄⟩—C₄H₉(n) |
| | III-5 | C₄H₉(n) | —⟨C₆H₄⟩—C₇H₁₅(n) |
| | III-6 | H | H |

In the present invention, it is required to use at least one of each dye represented by the formula I, II and III. It is further preferable that each of the dyes of these three types is selected from among the preferable ones described above.

Furthermore, it is preferable to use two or more dyes represented by the general formula III.

In the above case, it is still preferable to use in combination of at least one dye of the general formula III wherein $R^7$ is a hydrogen atom and at least one wherein $R^7$ is a

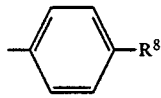

group.

Furthermore, it is preferable that cyclohexyl groups in the general formulae I, II and III are each a trans-cyclohexyl group.

Examples of the liquid crystals to be used in the present invention include those represented by the following general formulae:

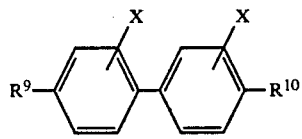

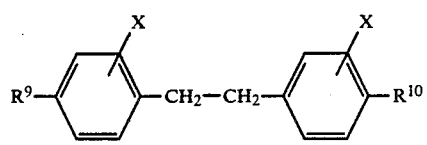

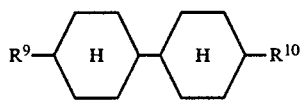

-continued

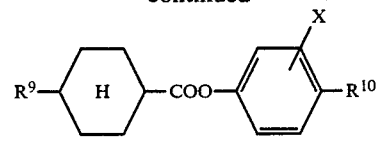

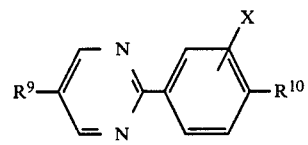

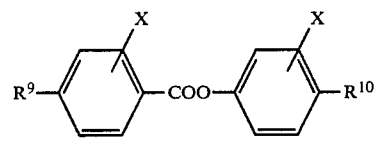

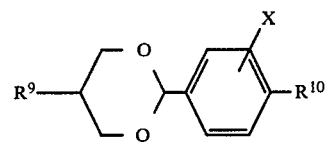

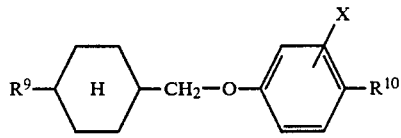

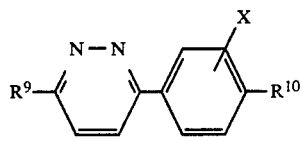

and

-continued

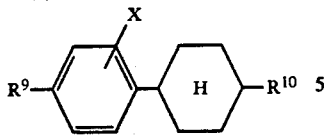

wherein $R^9$ and $R^{10}$ represent each an alkyl, an alkoxyalkyl, an alkoxy, and alkylphenyl, an alkoxyalkylphenyl, an alkoxyphenyl, an alkylcyclohexyl, an alkoxyalkylcyclohexyl, an alkylcyclohexylphenyl, a cyanophenyl, a cyano group, a halogen atom, an alkoxycarbonyl, an alkoxyalkoxycarbonyl, an alkylphenoxycarbonyl, an alkoxyalkylphenoxycarbonyl, an alkoxyphenoxycarbonyl, an alkylcyclohexyloxycarbonyl, an alkoxycyclohexyloxycarbonyl, an alkylcyclohexylphenoxycarbonyl, a cyanophenoxycarbonyl, a halogenphenoxycarbonyl, an alkylphenylalkyl, an alkoxyalkylphenylalkyl, an alkoxyphenylalkyl, an alkylcyclohexylalkyl, an alkoxyalkoxycyclohexylalkyl, an alkylcyclohexylphenylalkyl or a cyanophenylalkyl group, wherein an alkyl or an alkoxy chain may optionally have an optical active center and a phenyl or a phenoxy group in the $R^9$ or $R^{10}$ group may be optionally substituted with a halogen atom such as a fluorine or a chlorine atom; and X represents a hydrogen atom or a halogen atom such as a fluorine or chlorine atom; and mixtures thereof.

Preferable examples thereof are nematic liquid crystal mixtures mainly comprising a phenylcyclohexane liquid crystal compound.

The abovementioned liquid crystal mixture may further contain various additives such as an optically active material such as cholesteryl nonanoate, an UV absorber or an antioxidant.

The liquid crystal composition of the present invention may be readily prepared by dissolving the dyes represented by the above formulae I, II and III in the abovementioned liquid crystal material.

The liquid crystal composition thus obtained is inserted into electrodes, at least one of which is transparent, to thereby form a display element by taking advantage of the guest/host effect.

The abovementioned display element may be constructed according to a method described in, for example, "Ekisho no Saishin Gijutsu" [S. Matsumoto and I. Tsunoda, Kogyo Chosakai, 34 (1983) or J.L. Fergason SID85 Digest, 68 (1985)].

BEST MODE FOR CARRYING OUT THE PRESENT INVENTION

To further illustrate the present invention, and not by way of limitation, the following Examples will be given.

In the following Examples, the dichroic properties are evaluated by the order parameter (S) of each dye compound calculated according to the following equation:

$$(S) = (A// - A\perp)/(2A\perp + A//)$$

wherein $A//$ and $A\perp$ represent the absorbances of the dye against lights parallelly and vertically polarized to the direction of the alignment of the liquid crystals respectively.

More particularly, the order parameter (S) indicates the display contrast of a guest/host type liquid crystal display element. As this value theoretically aproaches 1, the degree of the residual coloration in a white part is lowered, which enables a clear display of a high contrast ratio.

The number of each dye used in the following Examples corresponds to those specified in Table 1.

Example 1

The following dichroic dyes were dissolved in 100 g of a liquid crystal mixture mainly comprising phenylcyclohexane compounds (ZLI-1565 mfd. by E. MERCK Co.) to thereby prepare a liquid crystal composition 1.
Dye
I-1 4.13 g
II-1 2.76g
III-1 1.20 g and
III-4 2.00 g.

Next, the liquid crystal composition thus obtained was charged into a cell having 9 μm gap and consisting of a glass plates provided transparent electrodes, on which a polyimide resin had been applied and hardened followed by being homogeneously aligning by rubbing, positioned in such a manner that said liquid crystal display element was obtained.

The order parameters (S) of this liquid crystal display element at 637, 575, 535 and 469 nm were 0.74, 0.76, 0.75 and 0.78 respectively, while the absorbances ($A//$) to the light parallelly polarized to the direction of the alignment were 1.470, 1.912, 1.590 and 1.770 respectively. The liquid crystal composition 1 and the cell containing the same were allowed to stand at −20° C. for 1000 hours. As a result, no abnormality such as the precipitation of the dyes was observed. The light-resistance of the cell containing the liquid crystal composition 1 was rested by using a Fade-Ometer (carbon arc light source). As a result, the hue change (ΔE) after 100 hours (determined by L*a*b* method) was not more than 1.5 while the current gain (I/Io; applied voltage: 5 V, 32 Hz) was 5.5.

Example 2

The procedure of Example 1 was repeated except that the following dichroic dyes were used to thereby give a liquid crystal composition.
Dye
I-3 4.20 g
II-1 2.76 g
III-1 1.20 g and
III-4 2.00 g.

Next, a display element was formed by using the above liquid crystal composition. The order parameters of this liquid crystal display element at 637, 575, 535 and 469 nm were 0.74, 0.76, 0.75 and 0.78 respectively, while the absorbances ($A//$) to the light parallelly polarized to the direction of the alignment were 1.470, 1.912, 1.590 and 1.770 respectively. The liquid crystal composition and the cell containing the same were allowed to stand at −20° C. for 1000 hours. As a result, the liquid crystal composition remained stable. The light-resistance of the cell was tested in the same manner as the one described in Example 1. Then it showed a ΔE value (L*a*b* method) of not more than 1.5 and a current gain (I/Io) of 5.5.

Example 3

The procedure of Example 1 was repeated except that the following dichroic dyes were used to thereby give a liquid crystal composition II.
Dye
I-4 2.30 g I-5 2.15 g
II-1 2.76 g
III-1 1.20 g
III-4 1.00 g and
III-5 1.20 g.

Next, a display element was formed by using the above liquid crystal composition II. The order parameters(s) of this liquid crystal display element at 636, 575, 533 and 468 nm were 0.74, 0.76, 0.75 and 0.79 respectively, while the absorbances (A//) to the light parallelly polarized to the direction of the alignment were 1.480, 1.910, 1.595 and 1.780 respectively. The liquid crystal composition II and the cell containing the same were allowed to stand at −20° C. for 1000 hours. As a result, no abnormality such as the precipitation of the dyes was observed. The light-resistance of the cell containing the liquid crystal composition II was tested by using a Fade-Ometer (carbon arc light source). As a result, the hue change (ΔE) after 100 hours (L*a*b* method) was not more than 1.5 and a current gain (I/Io; applied voltage: 5 V, 32 Hz) of 5.2.

Example 4

The following dichroic dyes were dissolved in 100 g of a liquid crystal mixture mainly comprising phenylcyclohexane compounds (ZLI-1840 mfd. by E. MERCK Co.) to thereby prepare a liquid crystal composition III.

Dye
I-6 3.45 g
I-7 3.23 g
II-1 4.10 g
III-1 0.90 g
III-2 1.02 g
III-4 1.65 g and
III-5 1.88 g.

Next, the liquid crystal composition thus obtained was charged into a cell having 9 μm gap and consisting of a glass plates provided with transparent electrodes, on which a polyimide resin had been applied and hardened followed by being homogeneously aligning by rubbing, positioned in such a manner that said aligned surfaces were faced to each other. Thus a liquid crystal display element was obtained.

The order parameters (S) of this liquid crystal display element at 635, 580, 535 and 470 nm were 0.74, 0.76, 0.75 and 0.77 respectively, while the absorbances (A//) to the light parallelly polarized to the direction of the alignment were 2.230, 2.860, 2.400 and 2.670 respectively. The liquid crystal composition III and the cell containing the same were allowed to stand at −20° C. for 1000 hours. As a result, no abnormality such as the precipitation of the dyes was observed. The light-resistance of the cell containing the liquid crystal composition III was tested by using a Fade-Ometer (carbon arc light source). As a result, the hue change (ΔE) after 100 hours (determined by L*a*b* method) was not more than 1.7 while the current gain (I/Io; applied voltage: 5 V, 32 Hz) was 5.9.

Example 5

The following dichroic dyes were dissolved in 100 g of a liquid crystal mixture mainly comprising phenylcyclohexane compounds (9160; mfd. by Chisso K.K.) to thereby prepare a liquid crystal composition IV.

Dye
I-5 1.40 g
I-8 1.30 g
I-9 1.55 g
II-1 1.40 g
II-2 1.48 g
III-1 0.49 g
III-2 0.52 g
III-3 0.25 g
III-4 1.10 g and
III-5 1.25 g.

Next, the liquid crystal composition thus obtained was charged into a cell having 9 μm gap and consisting of glass plates provided with transparent electrodes, on which a polyimide resin had been applied and hardened followed by being homogeneously aligning by rubbing, positioned in such a manner that said aligned surfaces were faced to each other. Thus a liquid crystal display element was obtained.

The order parameters (S) of this liquid crystal display element at 635, 577, 535 and 466 nm were 0.75, 0.76, 0.75 and 0.79 respectively, while the absorbances (A//) to the light parallelly polarized to the direction of the alignment were 1.520, 1.970, 1.615 and 1.820 respectively. The liquid crystal composition IV and the cell containing the same were allowed to stand at −20° C. for 1000 hours. As a result, no abnormality such as the precipitation of the dyes was observed.

The light-resistance of the cell containing the liquid crystal composition IV was tested by using a Fade-Ometer (carbon arc light source). As a result, the hue change (ΔE) after 100 hours (determined by L*a*b* method) was not more than 1.3 while the current gain (I/Io; applied voltage: 5 V, 32 Hz) was 5.2.

POSSIBILITY FOR UTILIZING IN INDUSTRY

The present invention provides a liquid crystal composition wherein specific dichroic dyes are combined and a guest/host effect is utilized as well as a display element employing the same. This liquid crystal composition is excellent in stability at a low temperature, contrast and light-resistance and thus highly useful in a display element suitable for a medium to large-scale display and as a liquid crystal composition therefor.

We claim:

1. A liquid crystal composition comprising at least one compound represented by each of the following general formulae I, II and III:

general formula I:

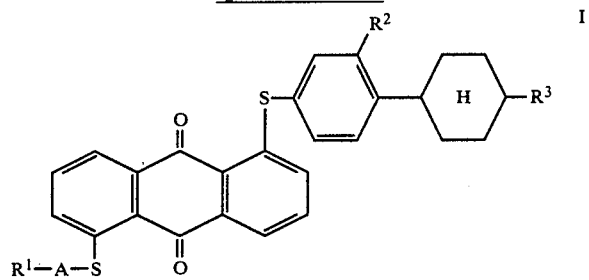

wherein $R^1$ to $R^3$ represent each a hydrogen atom, an alkyl, an optionally substituted cycloalkyl, an alkoxyalkyl or an alkoxy group or a halogen atom; and A represents a

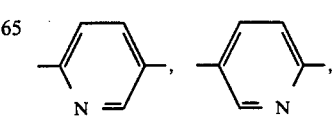

-continued

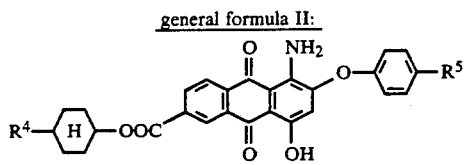

group;

general formula II:

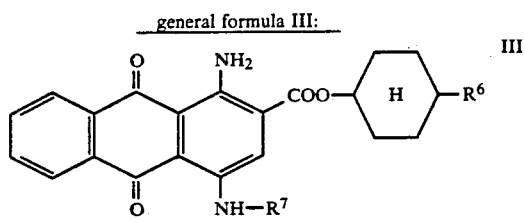

wherein R⁴ and R⁵ represent each a hydrogen atom, an alkyl, an optionally substituted cycloalkyl, an alkoxyalkyl or an alkoxy group or a halogen atom; and general formula III:

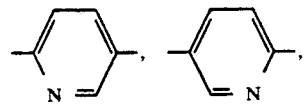

wherein R⁶ represents a hydrogen atom, an alkyl, an optionally substituted cycloalkyl, an alkoxyalkyl or an alkoxy group or a halogen atom; and R⁷ represents a hydrogen atom or a

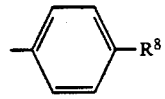

group wherein R⁸ represents a hydrogen atom, an alkyl, an optionally substituted cycloalkyl, an alkoxyalkyl or an alkoxy group or a halogen atom.

2. A liquid crystal composition as claimed in claim 1, wherein said dye represented by the general formula I is at least one dye selected from among those of the general formula I wherein R¹ and R³ represent each a hydrogen atom or an alkyl group;

R² represents a hydrogen atom; and A represents a

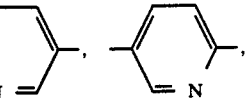

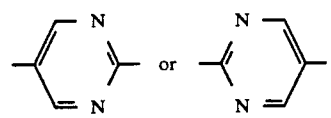

group.

3. A liquid crystal composition as claimed in claim 1, wherein said dye represented by the general formula I is at least one dye selected from among those of the general formula I wherein R¹ and R³ represent each a hydrogen atom or an alkyl group having 1 to 8 carbon atoms; R² represents a hydrogen atom; and A represents a

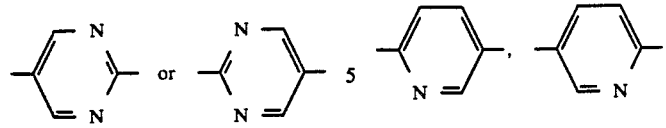

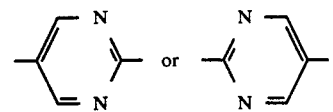

group.

4. A liquid crystal composition as claimed in claim 1, wherein said dye represented by the general formula I is at least one dye selected from among those of the general formula I wherein R¹ represents a hydrogen atom or an alkyl group having 1 to 8 carbon atoms;

R² represents a hydrogen atom;

R³ represents an alkyl group having 1 to 8 carbon atoms; and

A represents a

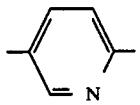

group.

5. A liquid crystal composition as claimed in claim 1, wherein said dye represented by the general formula I is at least one dye selected from among those Of the general formula I wherein R¹ and R² represents each a hydrogen atom;

R³ represents an alkyl group having 1 to 8 carbon atoms; and

A represents a

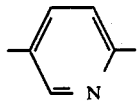

group.

6. A liquid crystal composition as claimed in claim 1, wherein said dye represented by the general formula I is at least one dye selected from among those of the general formula II wherein R⁴ and R⁵ represent each a hydrogen atom or an alkyl group.

7. A liquid crystal composition as claimed in claim 1, wherein said dye represented by the general formula II is at least one dye selected from among those of the general formula II wherein R⁴ and R⁵ represent each an alkyl group having 2 to 8 carbon atoms.

8. A liquid crystal composition as claimed in claim 1, wherein said dye represented by the general formula III is at least one dye selected from among those of the general formula III wherein R⁶ represents a hydrogen atom or an alkyl group;

R⁷ represents a hydrogen atom or a

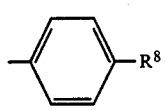

group; and $R^8$ represents a hydrogen atom or an alkyl group.

9. A liquid crystal composition as claimed in claim 1, wherein said dye represented by the general formula III is at least one dye selected from among those of the general formula III wherein $R^6$ represents an alkyl group having 2 to 10 carbon atoms;

$R^7$ represents a hydrogen atom or a

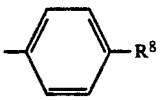

group; and $R^8$ represents an alkyl group having 2 to 8 carbon atoms.

10. A liquid crystal composition as claimed in claim 1, which comprises at least one dye selected from among those of general formula I wherein $R^1$ and $R^3$ represent each a hydrogen atom or an alkyl group;

$R^2$ represent a hydrogen atom; and A represents a

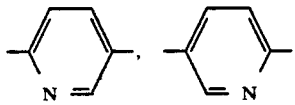

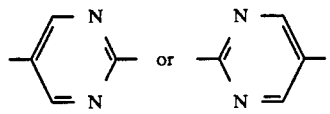

group, as said dye represented by the general formula I; at least one dye selected from among those of the general formula II wherein $R^4$ and $R^5$ represent each a hydrogen atom or an alkyl group, as said dye represented by the general formula II; and at least one dye selected from among those of the general formula III wherein $R^6$ represents a hydrogen atom or an alkyl group; $R^7$ represents a hydrogen atom or a

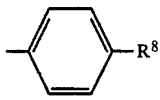

group; and $R^8$ represents a hydrogen atom or an alkyl group; as said dye represented by the general formula III.

11. A liquid crystal composition as claimed in claim 1, which comprises at least one dye selected from among those of general formula I wherein $R^1$ and $R^3$ represent each a hydrogen atom or an alkyl group having 1 to 8 carbon atoms;

$R^2$ represent a hydrogen atom; and
A represents a

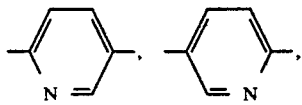

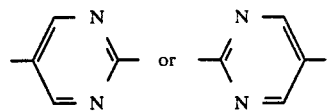

group;
as said dye represented by the general formula I;

at least one dye selected from among those of the general formula II wherein $R^4$ and $R^5$ represent each an alkyl group having 2 to 8 carbon atoms, as said dye represented by the general formula II; and at least one dye selected from among those of the general formula III wherein $R^6$ represents an alkyl group having 2 to 10 carbon atoms;

$R^7$ represents a hydrogen atom or a

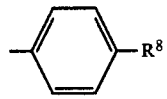

group; and $R^8$ represents an alkyl group having 2 to 8 carbon atoms; as said dye represented by the general formula III.

12. A liquid crystal composition as claimed in claim 1, which comprises at least one dye selected from among those of general formula I wherein $R^1$ represents a hydrogen atom or an alkyl group having 1 to 8 carbon atoms;

$R^2$ represent a hydrogen atom;

$R^3$ represents an alkyl group having 1 to 8 carbon atoms; and

A represents a

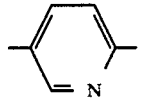

group;
as said dye represented by the general formula I;

at least one dye selected from among those of the general formula II wherein $R^4$ and $R^5$ represent each an alkyl group having 2 to 8 carbon atoms, as said dye represented by the general formula II; and at least one dye selected from among those of the general formula III wherein $R^6$ represents an alkyl group having 2 to 10 carbon atoms;

$R^7$ represents a hydrogen atom or a

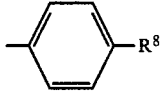

group; and $R^8$ represents an alkyl group having 2 to 8 carbon atoms; as said dye represented by the general formula III.

13. A liquid crystal composition as claimed in claim 1, which comprises two or more dyes selected from those represented by the general formula III.

14. A liquid crystal composition as claimed in claim 13, wherein at least one dye of the general formula I wherein $R^7$ is a hydrogen atom is employed together with at least one dye of the general formula I wherein $R^7$ is a

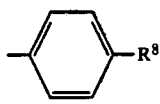

group.

15. A liquid crystal composition as claimed in claim 1, wherein a nematic liquid crystal mixture comprising phenylcyclohexane liquid crystal compound(s) as the major component is used as said liquid crystal material.

16. A display element comprising a liquid crystal composition charged between electrode bases at least one of which is a transparent, wherein said liquid crystal composition comprises at least one compound represented by each of the following general formulae I, II and III:

general formula I:

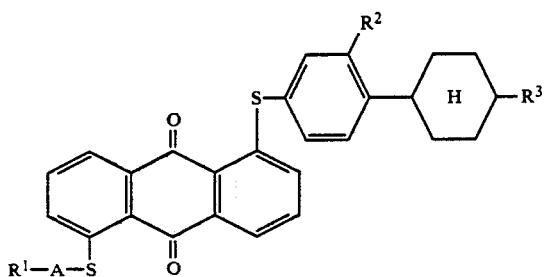

wherein $R^1$ to $R^3$ represent each a hydrogen atom, an alkyl, an optionally substituted cycloalkyl, an alkoxyalkyl or an alkoxy group or a halogen atom; and A represents a

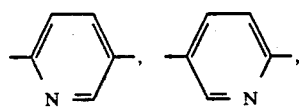,

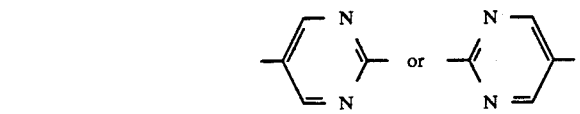

group;

general formula II:

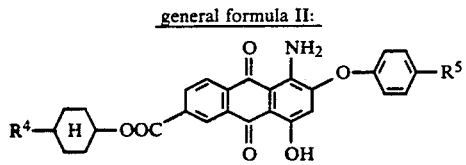

wherein $R^4$ and $R^5$ represent each a hydrogen atom, an alkyl, an optionally substituted cycloalkyl, an alkoxyalkyl or an alkoxy group or a halogen atom; and general formula III:

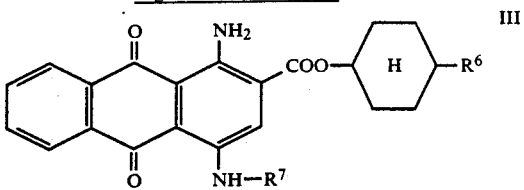

wherein $R^6$ represents a hydrogen atom, an alkyl, an optionally substituted cycloalkyl, an alkoxyalkyl or an alkoxy group or a halogen atom; and $R^7$ represents a hydrogen atom or a

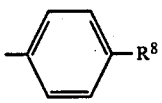

group wherein $R^8$ represents a hydrogen atom, an alkyl, an optionally substituted cycloalkyl, an alkoxyalkyl or an alkoxy group or a halogen atom.

17. A display element as claimed in claim 16, wherein a liquid crystal composition which comprises at least one dye selected from among those of general formula I wherein $R^1$ and $R^3$ represent each a hydrogen atom or an alkyl group;
$R^2$ represent a hydrogen atom; and
A represents a

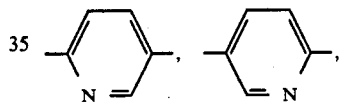

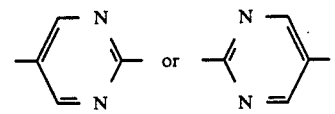

group,
as said dye represented by the general formula I;
at least one dye selected from among those of the general formula II wherein $R^4$ and $R^5$ represent each a hydrogen atom or an alkyl group, as said dye represented by the general formula II; and
at least one dye selected from among those of the general formula III wherein $R^6$ represents a hydrogen atom or an alkyl group;
$R^7$ represents a hydrogen atom or a

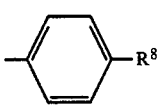

group; and
$R^8$ represents a hydrogen atom or an alkyl group, as said dye represented by the general formula III; is used.

18. A display element as claimed in claim 16, wherein a liquid crystal composition as claimed in claim 16 which comprises at least one dye selected from among those of general formula I wherein $R^1$ represents a hydrogen atom or an alkyl group having 1 to 8 carbon atoms;

$R^2$ represent a hydrogen atom;

$R^3$ represents an alkyl group having 1 to 8 carbon atoms; and

A represents a

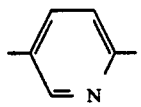

group, as said dye represented by the general formula I;

at least one dye selected from among those of the general formula II wherein $R^4$ and $R^5$ represent each an alkyl group having 2 to 8 carbon atoms, as said dye represented by the general formula II; and at least one dye selected from among those of the general formula III wherein $R^6$ represents an alkyl group having 2 to 10 carbon atoms;

$R^7$ represents a hydrogen atom or a

—⟨benzene⟩—$R^8$ group; and $R^8$ represents an alkyl group having 2 to 8 carbon atoms;

as said dye represented by the general formula III; is used.

19. A display element as claimed in claim 16, wherein said liquid crystal material is a nematic liquid crystal mixture comprising phenylcyclohexane liquid crystal compound(s) as the major component.

* * * * *